United States Patent [19]

Wegehaupt et al.

[11] Patent Number: 4,637,958

[45] Date of Patent: Jan. 20, 1987

[54] METHOD FOR IMPROVING THE ADHESION OF ELASTOMERS TO A COATED SUBSTRATE

[75] Inventors: Karl-Heinrich Wegehaupt, Burghausen; Hans-Rudolf Pfeffer, Emmerting, both of Fed. Rep. of Germany

[73] Assignee: Wacker-Chemie GmbH, Munich, Fed. Rep. of Germany

[21] Appl. No.: 720,466

[22] Filed: Apr. 5, 1985

[30] Foreign Application Priority Data

May 17, 1984 [DE] Fed. Rep. of Germany ....... 3418406

[51] Int. Cl.$^4$ .......................... B32B 15/08; C09J 5/04
[52] U.S. Cl. .................................. 428/416; 156/307.5; 156/314; 156/315; 156/329; 427/410; 524/364; 524/390
[58] Field of Search ...................... 156/307.5, 315, 314, 156/329; 427/410; 428/416; 524/364, 390

[56] References Cited

U.S. PATENT DOCUMENTS

| | | | |
|---|---|---|---|
| 3,022,196 | 2/1962 | Jenkins et al. | 156/329 |
| 3,705,076 | 12/1972 | Usala | 524/390 |
| 4,133,938 | 1/1979 | Bingham | 156/329 |
| 4,431,472 | 2/1984 | Höhl et al. | 156/315 |

*Primary Examiner*—John J. Gallagher

[57] ABSTRACT

A method for improving the adhesion of elastomers derived from compositions which are crosslinked by a condensation reaction and which are based on diorganopolysiloxanes containing rod-shaped copolymers formed by the free-radical copolymerization of styrene and (meth)acrylic acid ester in the presence of the diorganopolysiloxanes, to an undercoating consisting of an epoxy resin and pitch or tar, which comprises applying a primer having SiC-bonded organic groups to the undercoating prior to the application of the crosslinkable composition, in which the primer consists of a solution of (a) a copolymer of a (meth)acrylic acid ester free of silicon atoms and a (meth)acryloxyalkylsilane containing at least one SiOC-bonded monovalent organic group; and
(b) a silane which contains a SiC-bonded organic group having at least one amino or imino group and which contains at least one SiOC-bonded monovalent organic group and/or a partial hydrolyzate of such silane in an organic solvent.

16 Claims, No Drawings

METHOD FOR IMPROVING THE ADHESION OF ELASTOMERS TO A COATED SUBSTRATE

The present invention relates to a method for improving the adhesion of elastomers to a coated substrate, particularly to a method for improving the adhesion of organopolysiloxanes which crosslink at room temperature to a coated substrate and more particularly to a primer composition for improving the adhesion of elastomers which are crosslinked by a condensation reaction to a coated substrate.

BACKGROUND OF THE INVENTION

Silicone elastomers have been bonded to various substrates with primer compositions. For example, U.S. Pat. No. 4,133,938 to Bingham describes a primer composition which is obtained from the reaction of an acrylate and an acryloxyalkyl-alkoxysilane for bonding silicone elastomers to porous substrates.

Also, U.S. Pat. No. 4,431,472 to Höhl et al describes primer compositions which have been employed to improve the adhesion of elastomers, derived from crosslinkable compositions based on diorganopolysiloxanes containing rod-shaped copolymers formed by the free-radical copolymerization of styrene and acrylic acid ester in the presence of the diorganopolysiloxanes, to undercoatings consisting of epoxy resin and pitch or tar. The primer composition described therein consists of a mixture containing a silane having an SiC-bonded aliphatic multiple bond and a silane having an SiC-bonded epoxy group. The primer composition is applied to the undercoating prior to the application of the crosslinkable organopolysiloxane composition.

Therefore, it is an object of the present invention to provide bonding between organopolysiloxane elastomers which are derived from crosslinkable compositions based on diorganopolysiloxanes containing insitu generated rod-shaped copolymers formed from the free-radical copolymerization of styrene and acrylic acid ester and coatings based on an epoxy resin and pitch or tar, which bond is particularly strong and stable when exposed to water, especially water which contains inorganic salts such as sea water.

Another object of the present invention is to provide a method for improving the adhesion of organopolysiloxane elastomers to substrates. Still another object of the present invention is to provide a method for improving the adhesion of organopolysiloxane elastomers to substrates coated with an epoxy resin and pitch or tar. A further object of the present invention is to provide a method for improving the adhesion of organopolysiloxane elastomers which are derived from compositions containing diorganopolysiloxanes which are crosslinked by a condensation reaction and contain insitu generated rod-shaped copolymers which are obtained from the free-radical copolymerization of styrene and an acrylic acid ester. A still further object of the present invention is to provide a substrate having an undercoating of an epoxy resin and pitch or tar and an overcoating of organopolysiloxane elastomers which are derived from crosslinkable compositions based on diorganopolysiloxanes containing insitu generated rod-shaped copolymers obtained from the free-radical copolymerization of styrene and an acrylic acid ester in the presence of the diorganopolysiloxanes.

SUMMARY OF THE INVENTION

The foregoing objects and others which will become apparent from the following description are accomplished, generally speaking, by providing a method for improving the adhesion of organopolysiloxane elastomers derived from compositions that are crosslinked by a condensation reaction and are based on diorganopolysiloxanes which contain rod-shaped copolymers formed insitu by the free-radical copolymerization of styrene and (meth)acrylic acid ester in the presence of the diorganopolysiloxanes, to undercoatings based on epoxy resin and pitch or tar which comprises applying to the undercoating a primer composition containing in an organic solvent,
  (a) a copolymer consisting of a (meth)acrylic acid ester free of silicon atoms and a (meth)acryloxyalkylsilane having at least one SiOC-bonded monovalent organic group, and
  (b) a silane which contains a SiC-bonded organic group having at least one amino or imino group and which contains at least one SiOC-bonded monovalent organic group, or partial hydrolyzate of such a silane, or mixtures thereof.

In another embodiment, a substrate having an epoxy resin and pitch or tar coating thereon is coated with a primer having SiC-bonded organic groups and then with an overcoating of an organopolysiloxane composition which is crosslinked by a condensation reaction to form an elastomer in which the organopolysiloxane composition contains rod-shaped copolymers formed insitu by the free-radical copolymerization of styrene and (meth)acrylic acid ester in the presence of the organopolysiloxane, in which the primer comprises
  (a) a copolymer of (meth)acrylic acid ester free of silicon atoms and a (meth)acryloxyalkylsilane having at least one SiOC-bonded monovalent organic group; and
  (b) a silane which contains a SiC-bonded organic group having at least one amino or imino group and also contains at least one SiOC-bonded monovalent organic group, or the partial hydrolyzate of such a silane, or mixtures thereof.

DESCRIPTION OF THE INVENTION

The primer composition applied to a coating of epoxy resin and pitch or tar is an organic solvent solution of
  (a) a copolymer consisting of a (meth)acrylic acid ester free of silicon atoms and a (meth)acryloxyalkylsilane having at least one SiOC-bonded monovalent organic group; and
  (b) a silane which contains a SiC-bonded organic group having at least one amino or imino group and also contains at least one SiOC-bonded monovalent organic group or partial hydrolyzates of said silane or mixtures of said silane and partial hydrolyzates thereof. An organopolysiloxane composition which is crosslinked by a condensation reaction is applied over the primer composition, in which the organopolysiloxane composition is based on diorganopolysiloxanes containing rod-shaped copolymers which are obtained from the insitu free-radical copolymerization of styrene and (meth)acrylic acid ester in the presence of the diorganopolysiloxanes.

The (meth)acrylic acid esters which are free of silicon atoms and comprise a part of the copolymerized monomer of component (a) of the primer composition of this invention have the preferred formula $$(H_2C=CRCOO)_nR^1$$

in which R is hydrogen or the methyl group, preferably the methyl group and $R^1$ is a hydrocarbon group which contains from 1 to 10 carbon atoms and is free of aliphatic multiple bonds and n is 1 or 2. When n is 1, then $R^1$ is a monovalent group and when n is 2 then $R^1$ is a divalent hydrocarbon group. $R^1$ is preferably an alkyl group.

Methyl methacrylate and n-butyl methacrylate are the preferred (meth)acrylic acid esters which are free of silicon atoms.

A single type of (meth)acrylic acid ester which is free of silicon atoms may be used in the formation of component (a); however, it is also possible to use mixtures of at least two different types of (meth)acrylic acid esters free of silicon atoms, such as mixtures of methyl methacrylate and n-butyl methacrylate, to produce component (a).

Preferably from 4 to 20 parts by weight of (meth)acrylic acid ester free of silicon atoms are used per part by weight of (meth)acryloxyalkylsilane.

The (meth)acryloxyalkylsilanes preferably contain at least one SiOC-bonded monovalent organic group per molecule and have the general formula $$H_2C=CRCOOR^2R^3{}_mSi(OR^4)_{3-m}$$

in which R is the same as above, $R^2$ is an alkylene group having from 1 to 6 carbon atoms, $R^3$ is a monovalent hydrocarbon group having from 1 to 6 carbon atoms, $R^4$ is an alkyl group having from 1 to 5 carbon atoms and m is 0, 1 or 2, preferably 0.

In the (meth)acryloxyalkylsilanes, R preferably represents a methyl group.

A preferred alkylene group represented by $R^2$ is the group having the formula $-(CH_2)_3-$.

Other examples of formulas which may represent the $R^2$ group are $-(CH_2)_2-$ $-(CH_2)_4-$ $-(CH_2)_5-$ $-CH_2(CH_3)_2CCH_2-$ $-CH_2CH(CH_3)CH_2-$ and $-CH_2CH(CH_3)-$.

When the hydrocarbon group $R^3$ is present, it is preferably free of aliphatic multiple bonds. When m is 1 or 2, $R^3$ is preferably a methyl group. The hydrocarbon group represented by $R^3$ may also be a phenyl group.

Examples of alkyl groups represented by $R^4$ are methyl, ethyl, n-propyl, isopropyl, n-butyl, sec-butyl and n-pentyl radicals.

Preferred silanes having the formula indicated above are γ-methacryloxypropyltrimethoxysilane and γ-methacryloxypropyltriethoxysilane.

Only one type of silane having the above formula need be used to produce component (a); however, it is possible to use a mixture of at least two different types of such silanes to produce component (a).

The copolymers (a) can be prepared by known methods for copolymerizing olefinic monomers in which a (meth)acrylic acid ester free of silicon atoms and a (meth)acryloxyalkylsilane having at least one SiOC-bonded monovalent organic group are copolymerized in the presence of free radicals such as peroxy acid esters, e.g., tert-butyl peroctoate, while heating under reflux, preferably in the presence of a solvent which is inert with respect to the monomers, copolymers and radicals. An example of a suitable inert solvent is toluene.

The silanes (b) which contain one SiC-bonded organic group having at least one amino or imino group per molecule and which contain at least one SiOC-bonded monovalent organic group per molecule have the following preferred formula $R^5NHR^2Si(OR^6)_3$ where $R^2$ is the same as above, $R^5$ is hydrogen or a group of the formula $H_2N(CH_2)p$, where p is 2 or 3, and $R^6$ is a monovalent hydrocarbon group which may be substituted by an amino or alkoxy group and which contains a total of from 1 to 10 carbon atoms per group.

The group represented by $R^5$ is preferably a group of the formula $H_2N(CH_2)_2$.

The examples given above for the $R^2$ group in the acryloxyalkylsilane are also applicable for the $R^2$ group in silanes (b).

Preferably, $R^6$ is an alkyl group having from 1 to 5 carbon atoms.

Examples of silanes (b) are the N-β-aminoethyl-γ-aminopropyltriethoxysilane having the formula $$H_2N(CH_2)_2NH(CH_2)_3Si(OC_2H_5)_3,$$

N-β-aminoethyl-γ-aminopropyltrimethoxysilane having the formula $H_2N(CH_2)_2NH(CH_2)_3Si(OCH_3)_3$, β-aminoethyltriethoxysilane of the formula $$H_2N(CH_2)_2Si(OC_2H_5)_3,$$

a compound having the formula $$H_2N(CH_2)_2NH(CH_2)_3Si(OCH_2CH_2NH_2)_3,$$

N-β-aminoethyl-δ-aminobutyltriethoxysilane having the formula $H_2N(CH_2)_2NH(CH_2)_4Si(OC_2H_5)_3$, γ-aminopropyltriethoxysilane having the formula $$H_2N(CH_2)_3Si(OC_2H_5)_3,$$

aminomethyltriethoxysilane having the formula $$H_2NCH_2Si(OC_2H_5)_3,$$

N-β-aminomethyl-γ-aminopropyltris(methoxyethylenoxy)silane having the formula $$H_2N(CH_2)_2NH(CH_2)_3Si(OCH_2CH_2OCH_3)_3 \text{ and}$$

δ-aminobutyltriethoxysilane having the formula $$H_2N(CH_2)_4Si(OC_2H_5)_3.$$

Although one single type of silane may be used in (b); it is possible to use a mixture of at least two different types of silanes as component (b).

Copolymer (a) is used preferably in an amount of from 5 to 35 parts by weight per part by weight of silane (b).

In preparing the primers of this invention, any organic solvent which is chemically inert with respect to the epoxy resin and pitch or tar coatings and to components (a) and (b) and which evaporates at room temperature within a reasonable period of time may be used. A preferred mixture consists of from 15 to 35 percent by weight of toluene, 50 to 85 percent by weight of isobutanol and 0 to 10 percent by weight of acetone in which the percentages add up to 100 percent.

Components (a) and (b) are preferably present in the solution in an amount of from 8 to 20 percent by weight based on the weight of the solution.

The solution consisting of components (a) and (b) can be applied on the epoxy resin and pitch or tar coating by brushing, pouring, spraying or rolling.

After the solvent has evaporated, the primer is coated with a crosslinkable composition which forms an elastomer by a condensation reaction. The crosslinkable composition is based on a diorganopolysiloxane containing rod-shaped copolymers which are obtained from the free-radical copolymerization of styrene and a (meth)acrylic acid ester in the presence of the diorganopolysiloxane. The crosslinkable compositions may be applied to the primer by, for example, brushing, pouring, spraying or rolling.

The crosslinkable compositions which are applied to the primer are crosslinked by a condensation reaction to form elastomers. These compositions are commercially available and are based on a diorganopolysiloxane containing rod-shaped copolymers obtained from the free-radical copolymerization of styrene and (meth)acrylic acid ester in the presence of the diorganopolysiloxane. The compositions have been described heretofore in the literature and their methods of preparation are described, for example, in U.S. Pat. Nos. 3,555,109 to Getson; 3,776,875 to Getson; and in 4,032,499 to Kreuzer.

The rod-shaped copolymers which are formed in the presence of a diorganopolysiloxane by free-radical copolymerization are preferably composed of from 35 to 70 percent by weight of units derived from styrene while the remainder consists of units derived from (meth)acrylic acid ester.

The diorganopolysiloxane is preferably present in an amount of from 20 to 80 percent by weight based on the weight of the diorganopolysiloxane and the copolymer consisting of styrene and (meth)acrylic acid ester.

The preferred rod-shaped copolymers formed in the presence of the diorganopolysiloxane are those copolymers obtained from styrene and n-butyl acrylate. The n-butyl acrylate may also be substituted, at least in part, by, for example, methyl acrylate, ethyl acrylate, n-propyl acrylate, isopropyl acrylate, sec-butyl acrylate, methyl methacrylate, ethyl methacrylate, n-propyl methacrylate, isopropyl methacrylate and/or sec-butyl methacryalte.

Since the methyl groups are more readily available, it is preferred that at least 80 percent of the number of organic groups in the diorganosiloxane units be methyl groups.

The diorganopolysiloxane in whose presence the rod-shaped copolymer of styrene and (meth)acrylic acid ester is produced preferably has an average viscosity of from 150 to 6000 mPa.s at 25° C. prior to the copolymerization.

The crosslinkable compositions which form an elastomer by a condensation reaction, and which are used in this invention in the formation of coatings may be the so-called single or one-component systems, in which the mixtures are prepared in a single package in a premixed form, or they may be the so-called two-component systems which are prepared from at least two components more or less immediately prior to application to the primed coating of epoxy resin and pitch or tar.

Preferred single or one-component systems are prepared using crosslinking agents comprising silicon compounds which have a total of at least three amine groups bonded to silicon through nitrogen and/or at least three oxime groups bonded to silicon through oxygen per molecule. Other silicon compounds which may be employed are those which split off basic substances on crosslinking or those silicon compounds which split off neutral substances on crosslinking. Examples of such preferred crosslinking agents which may be used in the single-component systems are methyltris(methyl ethyl ketoximo)silane and a silane having the formula

$$Si(OCH_2COO\text{-}n\text{-}C_4H_9)_4.$$

Preferred two-component systems are those which use crosslinking agents comprising silicon compounds from which alcohols are liberated during crosslinking. Such single- and two-component systems are well known in the art.

In addition to the crosslinkable diorganopolysiloxane and the copolymer consisting of styrene and (meth)acrylic acid ester which is formed in the presence of the diorganopolysiloxane as well as crosslinking agents and possible crosslinking catalysts, the compositions which are used in this invention may contain other substances. Examples of such additional substances are inorganic fillers such as pyrogenic silicon dioxide or diatomaceous earth, solvents such as toluene or alkane mixtures having a boiling range of from about 80 to 110° C. at 1013 hPa (absolute), pigments such as aluminum powder, plasticizers such as trimethylsiloxy endblocked diorganopolysiloxanes having an average viscosity of from 50 to 10,000 mPa.s at 25° C. as well as epoxy resins. When the compositions contain epoxy resins, the preferred amount of epoxy resin is from 3 to 6 percent by weight based on the total weight of the diorganopolysiloxane and the copolymer formed in the presence of the diorganopolysiloxane.

The overcoat comprising the composition which has been crosslinked by a condensation reaction to form an elastomer and which is based on a diorganopolysiloxane containing rod-shaped copolymers which are formed in the presence of the diorganopolysiloxane by the free-radical copolymerization of styrene and (meth)acrylic acid ester, is particularly resistant to living organisms which are capable of forming a growth on surfaces in water, when after crosslinking, the coating contains a substance which is still fluid at room temperature. This substance is described in European Patent Application No. 00 32 597, published July 29, 1981, Shell International Research Maatschapij B.V.

Preferred examples of substances which are fluid at room temperature in addition to the trimethylsiloxy end-blocked diorganopolysiloxanes mentioned above as plasticizers, are paraffin, lubricating oils, polyisobutylenes having a molecular weight of from 350 or approximately 350, technical white oil as well as tricresyl phosphate.

When a substance which remains fluid after crosslinking of the organopolysiloxane composition to an elastomer is present in the composition, the preferred amount of this substance is from 10 to 80 percent by weight based on the total weight of the substance, the crosslinkable organopolysiloxane and the rod-shaped copolymers formed from styrene and (meth)acrylic acid ester.

The epoxy resin and pitch or tar coatings or mixtures thereof which are coated with the primer compositions of this invention are described in detail in, for example, Ullmann's Encyclopedia of Technical Chemistry, 3rd Edition, Volume 16, Munich-Berlin, 1965, p. 696 and in the references cited there. Such materials are available, for example, from the Berger Protection Co., New Castle, Great Britain; the W. u. J. Leigh & Co., Bolton, Great Britain and Hempel's Marine Paints A/S, Lyngby, Denmark.

The coatings of epoxy resin and pitch or tar are used in particular on metals such as steel or iron which are used in the construction of, for example, ship hulls, buoys, sea mines, piers in offshore drilling platforms or bridges and containers, including water basins or pipelines.

All parts and percentages in the following examples are by weight unless otherwise specified.

EXAMPLE 1

(a) An anhydrous mixture containing 20 parts of methyl methacrylate, 20 parts of n-butyl methacrylate, 5 parts of γ-methacryloxypropyltrimethoxysilane, 70 parts of toluene and 0.5 parts of tert-butyl peroctoate is refluxed for 8 hours. After cooling, the resultant mixture is first mixed with 300 parts of isobutanol and then with 8 parts of N-β-aminoethyl-γ-aminopropyltriethoxysilane.

(b) The resultant colorless solution thus obtained is brushed as a primer on an iron plate (50 mm×135×1 mm) which had previously been coated to a thickness of 120 micrometers with an epoxy resin and pitch or tar (identified as "Epilux 5") and allowed to dry for 8 hours at 22° C. before the primer was applied. ("Epilux 5" is a registered trademark and has a ratio of activating agent to the remainder of the components of 1:4 and is available from the Berger Protection Co., New Castle, Great Britain).

(c) Three hours after the solvent has evaporated, the crosslinkable composition is applied with a spray. The crosslinkable composition is prepared in the following manner:

(i) A mixture containing 5.2 kg (50 mol) of styrene, 4.2 kg (33 mol) of n-butyl acrylate, 4.04 kg of diorganopolysiloxane having one Si-bonded hydroxyl group in each terminal unit and a viscosity of 430 mPa.s at 25° C., 0.8 kg of water and 0.141 kg of 1,1-di-tert-butylperoxy-3,3,5-trimethylcyclohexane is heated under nitrogen for 7 hours by means of a steam jacket in a polymerization reactor having an interior diameter of 312 mm and a height of 600 mm and equipped with an anchor stirrer driven at 200 rpm and having a width of 295 mm at its widest point, a gas inlet pipe and a reflux condenser.

Nitrogen is first passed through the reaction mixture at 100° C. to 130° C. and then the reaction mixture is heated for 3 hours to 130° C. at 16 hPa (absolute) to remove unreacted monomer and water.

The resultant diorganopolysiloxane containing rod-shaped copolymers produced by the free-radical copolymerization of styrene and n-butyl acrylate in the presence of the diorganopolysiloxane has a viscosity of 45,000 mPa.s at 25° C. and a composition consisting of 30 percent of dimethylpolysiloxane, 31.5 percent of units derived from n-butyl acrylate and 38.5 percent of units derived from styrene.

(ii) About 65 parts of the diorganopolysiloxane composition prepared in (i) above are mixed with 16 parts of trimethylsiloxy end-blocked dimethylpolysiloxane having a viscosity of 350 mPa.s at 25° C., 21 parts of an alkane mixture having a boiling range of from 80 to 110° C. at 1013 hPa (absolute) and 1 part of pyrogenic silicon dioxide having a BET surface area of 200 m²/g. About 3 parts of a mixture containing 1 part of the compound having the formula

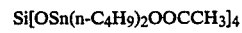

and 3 parts of tetra-n-propyl silicate are added and then the resultant diorganopolysiloxane composition is applied to the primed substrate.

The thickness of the elastomer, formed by crosslinking of the composition sprayed on the primed substrate in step (c) above, ranges from 0.5 to 0.7 mm.

EXAMPLE 2

The procedure described in Example 1 is repeated, except that in step (a) 0.5 parts of tert-butyl perisononanoate (liquid) are substituted for 0.5 parts tert-butyl peroctoate and 270 parts of isobutanol and 35 parts acetone are substituted for 300 parts of isobutanol and 2 parts of N-β-aminoethyl-γ-aminopropyltriethoxysilane are used instead of 8 parts of N-β-aminoethyl-β-aminopropyltriethoxysilane.

EXAMPLE 3

The procedure described in Example 1 is repeated, except that "Epigrip G 876", (available from the W. u. J. Leigh & Co., Bolton, Great Britain - "Epigrip" is a registered trademark) is substituted for the epoxy resin and pitch or tar identified as "Epilux 5".

EXAMPLE 4

The procedure described in Example 1 is repeated, except that in step (c) above, 16 parts of polyisobutylene having a molecular weight of 340 are substituted for the 16 parts of trimethylsiloxy end-blocked dimethylpolysiloxane.

EXAMPLE 5

The procedure in Example 1 is repeated, except that in (ii) above, 65 parts of the diorganopolysiloxane containing rod-shaped copolymers are first mixed with 8 percent based on the weight of the diorganopolysiloxane of methyltris(methylketoximo) silane and 0.1 percent based on the weight of the diorganopolysiloxane of di-n-butyltin diacetate and then with 16 parts of the trimethylsiloxy end-blocked diorganopolysiloxane having a viscosity of 350 mPa.s at 25° C., 21 parts of an alkane mixture having a boiling range of 80 to 110° C. at 1013 hPa (absolute) and 1 part of pyrogenic silicon dioxide having a BET surface area of 200 m²/g.

EXAMPLE 6

The procedure described in Example 3 is repeated, except that in step (c) above, 16 parts of polyisobutylene having a molecular weight of 340 are substituted for the 16 parts of trimethylsiloxy end-blocked dimethylpolysiloxane.

EXAMPLE 7

The procedure described in Example 2 is repeated, except that in step (b) above, "Epigrip G 876" is substituted for "Epilux 5".

EXAMPLE 8

The procedure described in Example 2 is repeated, except that in step (c) above, 16 parts of polyisobutylene having a molecular weight of 340 are substituted for the 16 parts of trimethylsiloxy end-blocked dimethylpolysiloxane.

EXAMPLE 9

The procedure described in Example 2 is repeated, except that in step (b) above, "Epigrip G 876" is substituted for "Epilux 5" and 16 parts of polyisobutylene having a molecular weight of 340 are substituted for the 16 parts of trimethylsiloxy end-blocked dimethylpolysiloxane.

The iron plates, coated in accordance with the procedures described in Examples 1 to 9, are exposed first for 6 days to air, then for 3 weeks to synthetic sea water at room temperature and finally for 2 weeks to synthetic seawater at a temperature of 70° C. Despite these storage conditions, it is impossible after storage to separate the elastomeric layer from the undercoat on any of the coated iron plates without damaging the elastomeric layer or the layer composed of epoxy resin and pitch.

What is claimed is:

1. A method for improving the adhesion of elastomers derived from compositions which are crosslinked by a condensation reaction and are based on diorganopolysiloxanes containing rod-shaped copolymers formed by the free-radical copolymerization of styrene and (meth)acrylic acid ester in the presence of the diorganopolysiloxanes, to an undercoating based on epoxy resin and pitch or tar, which comprises applying to the undercoating a primer composition containing in an organic solvent,
   (a) a copolymer of a (meth)acrylic acid ester free of silicon atoms and a (meth)acryloxyalkylsilane having at least one SiOC-bonded monovalent organic group; and
   (b) a silane which contains a SiC-bonded organic group having at least one amino or imino group and which contains at least one SiOC-bonded monovalent organic group, or a partial hydrolyzate of such a silane, or mixtures thereof and thereafter applying a crosslinkable composition to said primer composition.

2. The method of claim 1, wherein the (meth)acrylic acid ester free of silicon atoms used in the formation of copolymer (a) has the formula $$(H_2C=CRCOO)_nR^1$$

in which R is selected from the group consisting of hydrogen and the methyl group and $R^1$ is a hydrocarbon group which contains 1 to 10 carbon atoms, n is equal to 1 or 2, and when n is 1, $R^1$ is a monovalent hydrocarbon group and when n is 2, $R^1$ is a divalent hydrocarbon group.

3. The method of claim 1, wherein the (meth)acryloxyalkylsilane used in the formation of copolymer (a) has the formula $$H_2C=CRCOOR^2R^3{}_mSi(OR^4)_{3-m}$$

in which R is selected from the group consisting of hydrogen and the methyl group, $R^2$ is an alkylene group having from 1 to 6 carbon atoms, $R^3$ is a monovalent hydrocarbon group having from 1 to 6 carbon atoms, $R^4$ is an alkyl group having from 1 to 5 carbon atoms and m is 0, 1 or 2.

4. The method of claim 1, wherein from 4 to 20 parts by weight of (meth)acrylic acid ester free of silicon atoms are used per part by weight of (meth)acryloxyalkylsilane in the formation of copolymer (a).

5. The method of claim 1, wherein the silane (b) has the formula $$R^5NHR^2Si(OR^6)_3$$

in which $R^2$ is an alkylene group having from 1 to 6 carbon atoms, $R^5$ is selected from the group consisting of hydrogen and a group having the formula $H_2N(CH_2)p$, where p is equal to 2 or 3 and $R^6$ is selected from the group consisting of a monovalent hydrocarbon group and a monovalent hydrocarbon group substituted by an amino or alkoxy group having a total of from 1 to 10 carbon atoms per group.

6. The method of claim 1, wherein the copolymer (a) is present in an amount of from 5 to 35 parts by weight per part by weight of silane (b).

7. The method of claim 1, wherein the organic solvent is a mixture containing toluene and isobutanol.

8. The method of claim 1, wherein the organic solvent is a mixture containing toluene, isobutanol and acetone.

9. A coated substrate having an epoxy resin and pitch or tar coating thereon, a primer having SiC-bonded organic groups over said epoxy resin and pitch or tar coat and an overcoat over said primer of a composition which is crosslinked to form an elastomer by a condensation reaction, in which the elastomer is based on diorganopolysiloxanes containing rod-shaped copolymers formed from the free-radical copolymerization of styrene and (meth)acrylic acid ester in the presence of the diorganopolysiloxanes, said primer is obtained from an organic solvent solution containing
   (a) a copolymer of a (meth)acrylic acid ester free of silicon atoms and a (meth)acryloxyalkylsilane having at least one SiOC-bonded monovalent organic group; and
   (b) a silane which contains a SiC-bonded organic group having at least one amino or imino group and which contains at least one SiOC-bonded monovalent organic group, or a partial hydrolyzate of such a silane, or mixtures thereof.

10. The coated substrate of claim 9, wherein the (meth)acrylic acid ester free of silicon atoms used in the formation of copolymer (a) has the formula $$(H_2C=CRCOO)_nR^1$$

in which R is selected from the group consisting of hydrogen and the methyl group and $R^1$ is a hydrocarbon group which contains 1 to 10 carbon atoms, n is equal to 1 or 2, and when n is 1, $R^1$ is a monovalent hydrocarbon group and when n is 2, $R^1$ is a divalent hydrocarbon group.

11. The coated substrate of claim 9, wherein the (meth)acryloxyalkylsilane used in the formation of copolymer (a) has the formula $$H_2C=CRCOOR^2R^3{}_mSi(OR^4)_{3-m}$$

in which R is selected from the group consisting of hydrogen and the methyl group, $R^2$ is an alkylene group having from 1 to 6 carbon atoms, $R^3$ is a monovalent hydrocarbon group having from 1 to 6 carbon atoms, $R^4$ is an alkyl group having from 1 to 5 carbon atoms and m is 0, 1 or 2.

12. The coated substrate of claim 9, wherein from 4 to 20 parts by weight of (meth)acrylic acid ester free of silicon atoms are used per part by weight of (meth)acryloxyalkylsilane in the formation of copolymer (a).

13. The coated substrate of claim 9, wherein the silane (b) has the formula $$R^5NHR^2Si(OR^6)_3$$

in which $R^2$ is an alkylene group having from 1 to 6 carbon atoms, $R^5$ is selected from the group consisting of hydrogen and a group having the formula $H_2N(CH_2)p$, where p is equal to 2 or 3 and $R^6$ is selected from the group consisting of a monovalent hydrocarbon group and a monovlent hydrocarbon group substituted by an amino or alkoxy group having a total of from 1 to 10 carbon atoms per group.

14. The coated substrate of claim 9, wherein the copolymer (a) is present in an amount of from 5 to 35 parts by weight per part by weight of silane (b).

15. The coated substrate of claim 9, wherein the organic solvent is a mixture containing toluene and isobutanol.

16. The coated substrate of claim 9, wherein the organic solvent is a mixture containing toluene, isobutanol and acetone.

* * * * *